Aug. 24, 1926.
N. L. McGUIRE
1,597,089
MACHINE FOR PRODUCING LUBRICANTS
Filed Oct. 16, 1924
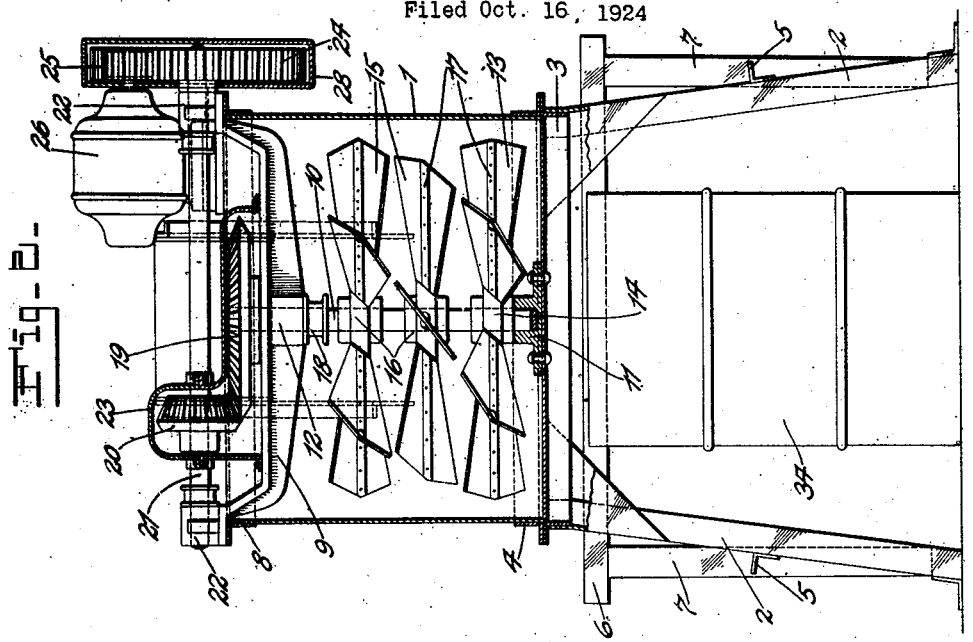
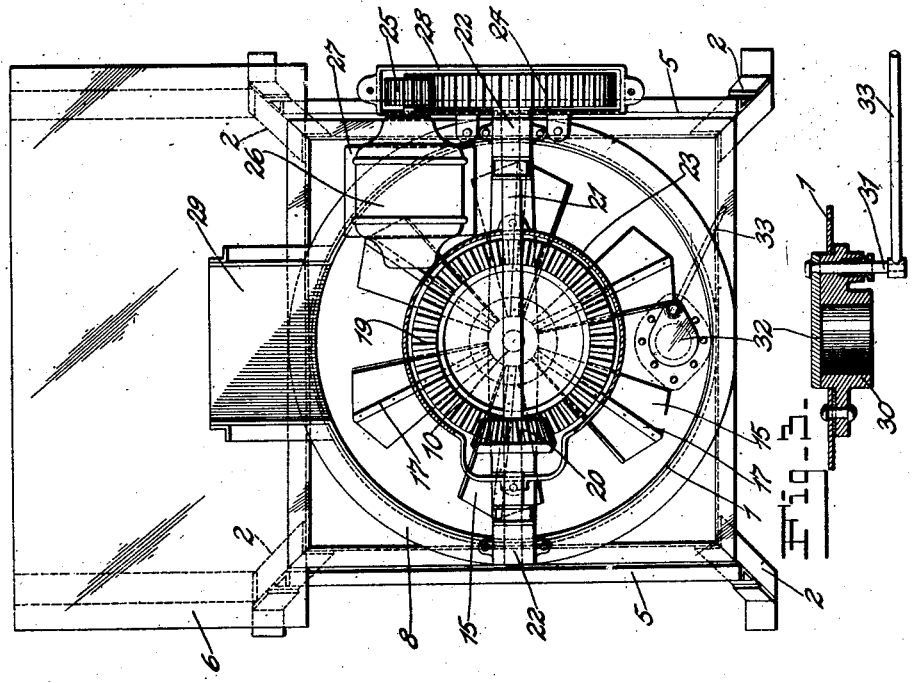
Inventor:
Nathaniel L. McGuire,
by Pipsey Kugeland
His Attorneys.

Patented Aug. 24, 1926.

1,597,089

UNITED STATES PATENT OFFICE.

NATHANIEL L. McGUIRE, OF ST. LOUIS, MISSOURI.

MACHINE FOR PRODUCING LUBRICANTS.

Application filed October 16, 1924. Serial No. 743,975.

This invention relates to a machine for producing a lubricant by the thorough admixture of an oil and a grease in an unheated state.

An object of the invention is to provide a machine operable to produce an improved lubricant for use as a gear lubricant or other purposes. The lubricant produced by operation of this machine, as hereinafter described, possesses a low cold test, so that it will not freeze in temperature above 0° Fahrenheit. The lubricant retains its uniform consistency in both cold and hot temperatures and is characterized by a high fire test so that it will not burn readily. The lubricant produced by this machine, as hereinafter described, overcomes the familiar existing difficulties encountered by users of many of the lubricants now on the market. For instance, because of its uniform consistency, the lubricant will not work out through the housing of the differential gears onto the brake bands or onto the tires; it does not freeze in any temperature above 0° Fahrenheit, but follows the gears and prevents the gear teeth from clashing against each other, and performs all of its intended functions.

Another object of the invention is to provide a machine for producing a lubricant of the character mentioned by subjecting the ingredients to a continuous circulation and agitation until a lubricant mixture is obtained of the desired consistency.

Other objects will appear from the following description, reference being made to the drawing in which—

Fig. 1 is a plan view of the machine showing the casing for the gearing in section.

Fig. 2 is a vertical sectional view of the machine.

Fig. 3 is an enlarged sectional view of the drain valve.

In the embodiment shown the machine is a portable unit in which the vertical cylindrical tank 1 is mounted upon a frame comprising upwardly converging legs 2 connected at their upper ends by angle bars 3, each of which has one flange extending outwardly above the ends of the legs 2 and the other flange extending downwardly at the inner sides of the legs 2.

The tank 1, near its lower end, is encircled by a band 4 made of an angle bar having one flange extending upwardly from the other flange extending rigidly to the tank 1, and the lower flange extending outwardly and seated upon the outwardly extended flanges of the bars 3. The lower end of the tank is slightly below the upper edges of the bars 3 so that the tank is held from lateral displacement in any direction. The legs 2 at two of the opposite sides of the frame are rigidly connected by angle bars 5 and at one of the other sides of the frame a platform 6 is supported by legs 7 in proper position to support a person operating a machine or filling the machine with material to be operated on.

The tank is encircled by another angle bar band 8, one flange of which extends outwardly at or near the upper end of the tank. A bar 9 extends transversely of the upper end of the tank and has its ends rigidly attached to the band 8. A vertical shaft 10 is mounted in the center of the tank and has its lower end in a bearing 11 attached to the bottom wall of the tank and its upper end journaled in a bearing 12 in the bar 9. The shaft 10 supports and operates a number of propellers by which the mixture in the tank is kept in continuous circulation from the top to the bottom and from the bottom to the top including a rotary movement. As shown, the shaft 10 is provided with three propellers, although the number may be varied as desired in order to obtain best results under different conditions. The lower propeller comprises a number of blades 13 radiating from a hub 14 rigid on the shaft 10 and all operating to force the material in the tank downwardly at the center and outwardly against the bottom of the tank and upwardly between the propeller blades and the wall of the tank.

The remaining propellers are of similar construction, each comprising a number of propeller blades 15 radiating from hubs 16 rigid with the shaft 10. The propeller blades of the series of propellers are arranged in staggered relationship; that is the propeller blades of the adjacent propellers are not in the same vertical planes, but the propellers blades of the second propeller from the bottom, for instance, are in the same vertical planes as the space between the propeller blades 13 of the lower propeller and so on.

All of the propeller blades are preferably of strong sheet metal inclining upwardly from their rear to their forward edges, that is in the direction in which they rotate, and are reinforced and strengthened by radial bars 17 attached to their upper and lower sides. The lower propeller is relatively close to the bottom of the tank and in actual use I have obtained satisfactory results by having the lower propeller blades spaced about one and one-half inches above the bottom of the tank.

The shaft is held against being raised by the propeller blades by a collar 18 attached to said shaft against the lower side of the bearing 12. The upper end of the shaft 10 has a relatively large gear wheel 19 attached thereto with which the pinion 20 on an operating shaft 21 meshes. The shaft 21 is journaled in bearings 22 supported by the ends of the bar 9. The gears 19 and 20 are enclosed in a housing 23.

To one end of the shaft 21 a large gear wheel 24 is attached and is rotated by a pinion 25 driven by the motor 26 mounted on a support 27 above the tank. The gears 24 and 25 are enclosed within a housing 28.

A filling chute 29 inclines upwardly from the upper end of the tank above the platform 6.

The bottom wall of the tank has a hole in which an outlet passage 30 is attached. A stem 31 extends through the body of the passage 30 and a valve plate 32 is attached to the upper end of said stem and is movable thereby to open and to close the passage 30. A lever 33 is attached to the lower end of the stem 31 for operative purposes.

The tank is supported at a height sufficient to permit a barrel or receptacle 34 to be placed thereunder to receive the contents of the tank when the valve 32 is opened.

By use of this machine I am enabled to produce a lubricant composition of superior qualities. A very satisfactory lubricant is obtained from mixtures of 600 steam refined cylinder oil and cup grease in proportions in which the amount of cup grease is varied to obtain light, or medium or heavy lubricant. By maintaining the circulation for a period of between two and three hours practically all lumps are eliminated and a smooth velvety lubricant composition is obtained.

What I claim and desire to secure by Letters Patent is:—

1. A machine of the character described comprising a frame, a tank supported by said frame, a bar extending diametrically across the upper end of the tank and having rigid connection therewith, said bar depending within the confines of the tank and having portions engaging and reinforcing the sides of the tank, a vertical shaft having bearing in said bar, series of propeller blades attached to said shaft below said bar, a gear wheel attached to said shaft above said bar, a shaft extending across the upper end of the tank above said gear wheel, a bearing at each side of the tank in which said second shaft is journaled, a pinion attached to said second shaft and meshing with said gear wheel, and means for rotating said second shaft.

2. A machine of the character described comprising a frame, a tank supported by said frame, a bar extending diametrically across the upper end of the tank and having rigid connection therewith, said bar depending within the confines of the tank and having portions engaging and reinforcing the sides of the tank, a vertical shaft having bearing in said bar, series of propeller blades attached to said shaft below said bar, a shaft extending across the upper end of the tank above said gear wheel, a bearing at each side of the tank in which said second shaft is journaled, a pinion attached to said second shaft and meshing with said gear wheel, means for rotating said second shaft, and an element rigid with said first shaft bearing against the under side of said bar holding said first shaft from vertical movement.

3. A machine of the character described comprising a tank, a bar extending diametrically across the upper end of said tank and having rigid connection therewith, said bar depending within the confines of the tank and having portions engaging and reinforcing the sides of the tank, a bearing on each end of said bar, a horizontal shaft journaled in said bearings, a vertical shaft in said tank extending through said bar, an element attached to said vertical shaft bearing against said bar limiting upward movement of said vertical shaft, intermeshing gears attached to said shafts respectively, and means for rotating said horizontal shaft.

4. A machine of the character described comprising a tank, a bar extending diametrically across the upper end of said tank and having rigid connection therewith, said bar depending within the confines of the tank and having portions engaging and reinforcing the sides of the tank, a bearing on each end of said bar, a horizontal shaft journaled in said bearings, a vertical shaft in said tank extending through said bar, an element attached to said vertical shaft bearing against said bar limiting upward movement of said vertical shaft, intermeshing gears attached to said shafts respectively, a gear wheel attached to one end of said horizontal shaft, a motor, and a gear wheel driven by said motor and meshing with said last named gear wheel.

NATHANIEL L. McGUIRE.